(12) United States Patent
Takahashi et al.

(10) Patent No.: US 6,206,683 B1
(45) Date of Patent: Mar. 27, 2001

(54) MOLDING DEVICE

(75) Inventors: Yuji Takahashi; Hideo Itakura; Yasuhiko Tanaka; Yasuhiko Oyamada, all of Sagamihara (JP)

(73) Assignee: Aida Engineering Co., Ltd. (JP)

( * ) Notice: Subject to any disclaimer, the term of this patent is extended or adjusted under 35 U.S.C. 154(b) by 0 days.

(21) Appl. No.: 09/249,711

(22) Filed: Feb. 12, 1999

(30) Foreign Application Priority Data

Feb. 23, 1998 (JP) .................................................. 10-057438
May 20, 1998 (JP) .................................................. 10-155200

(51) Int. Cl.⁷ .................................................... B29C 45/64

(52) U.S. Cl. ........................ 425/589; 425/451.9; 425/595

(58) Field of Search ................................... 425/150, 589, 425/590, 595, 451.9

(56) References Cited

U.S. PATENT DOCUMENTS 5,397,528 * 3/1995 Schraven et al. .................... 425/589

* cited by examiner

*Primary Examiner*—Tim Heitbrink
(74) *Attorney, Agent, or Firm*—Morrison Law Firm

(57) ABSTRACT

Two sets of linear motors are fixed on opposed sides of a molding head driving device. Each linear motor includes a movable slider facing a casing. The linear motor contains a molding head and a magnetic plate facing a molding head. The use of two linear motors cancels out the magnetic attraction between the facing linear motors. A linear roller guide is disposed vertically in a direction perpendicular to the magnetic attraction between the linear motors so that the magnetic attraction from the linear motors does not act on the linear roller guide. In another embodiment, three sets of molding head driving devices are disposed between left and right frames integrally formed projecting from a base to form a molding device. In a further embodiment a pair of double linear motors drives four molding head driving devices. The double linear motors are affixed together by, for example, bolts.

18 Claims, 12 Drawing Sheets

MOLDING DEVICE

BACKGROUND OF THE INVENTION

The present invention relates to a molding device for processing small, precision parts that present a light load and require high positioning accuracy for use in clean work environments and assembly lines.

Conventionally, hydraulic presses, crank presses that use a crank mechanism, and the like have been used as molding devices for processing small, precision parts that present a light load and require high positioning accuracy.

In addition to these types of presses, there have also been provided molding devices that use an AC servo motor to raise and lower a slide via a screw mechanism.

Furthermore, molding devices that use linear motors have also been developed. These devices take advantage of properties of linear motors such as high speed, high positioning accuracy, and efficient transfer of drive force involving quick acceleration and deceleration.

In conventional molding devices, a clamp press does not provide stable positioning accuracy for the bottom dead center of the slide due to thermal displacement and the like. With hydraulic presses, the use of oil, the installation space requirements, noise, and the like prevent their use in clean work environments.

With molding devices that use an AC servo motor as a drive source, it is a problem to provide high positioning accuracy. In addition, such devices raise safety concerns relating to power outages.

With molding devices that use a linear motor, the position at which the linear motor is attached to the guide device can result in the magnetic attraction from the linear motor applying a force to the guide device, which guides the raising and lowering of the molding head. This can cause a change in the gap between the magnetic plate and the movable slide of the linear motor, resulting in unstable thrust from the linear motor, deformation in the guide device leading to increased friction resistance that prevents smooth raising and lowering of the molding head, or the like.

OBJECTS AND SUMMARY OF THE INVENTION

It is an object of the present invention to provide a molding device which overcomes the problems described above.

It is a further object of the invention to provide a molding device that is highly accurate, and that has a positioning accuracy for the bottom dead center that is not affected by thermal displacement or the like. The present invention does not require a large installation space and can be used in clean work environments with limited noise and vibration. Positioning of the molding head during high-speed operations is reliable, and if power is lost during a power outage or when operations are stopped, the molding head is held reliably at a stopping position.

In order to achieve the objects described above, the present invention.

It is a still further object of the invention to provide multiple parallel molding devices which can be operated together or independently.

It is a still further object of the invention to provide multiple parallel molding devices on a common base, wherein the multiple molding devices are disposed between rails integrally projecting from the base.

The present invention provides a molding device that uses the thrust from linear motors including a magnetic plate and a movable slide to raise and lower a molding head guided by a guiding device disposed on a frame. Magnetic attraction between facing linear motors is canceled out by having two or more linear motors disposed facing each other separated by the molding head. The linear motors include either: a magnetic plate disposed toward the molding head and a movable slide disposed toward the frame; or a movable slide disposed toward the molding head and a magnetic plate disposed toward the frame. A guiding device is disposed to guide the raising and lowering of the molding head along a vertical direction perpendicular to the direction of magnetic attraction between the linear motors. The magnetic attraction from the linear motors is prevented from acting upon the guiding device.

The present invention can also provide a molding device as described above where the guiding device is formed as a linear roller guide, with at least two linear roller guides fixed on either side of the molding head. The linear roller guides include a guide rail and a roller unit, either with the guide rail disposed toward the molding head and the roller unit disposed toward the frame or with the roller unit disposed toward the molding head and the guide rail disposed toward the frame.

The present invention can also include a linear scale disposed to detect the position of the vertically moving molding head.

The present invention can also provide a molding device as described above where a counter-balancing device is disposed to balance the mass of the molding head, including an attached upper mold. This counter-balancing device can be formed from a spring device or an air-cylinder device.

The present invention can also include a support device disposed to support the vertically moving molding head at a stopping position when power to the molding device is shut off at the completion of an operation or due to a power outage. This support device can be formed as a spring-activated electromagnetically open device, a spring-activated air-pressure opening device, or a spring-activated oil-pressure device.

Briefly stated, the present invention provides two sets of linear motors fixed on opposed sides of a molding head driving device. Each linear motor includes a movable slider facing a casing. Each linear motor includes an armature plate movable adjacent a magnetic plate. The use of two linear motors cancels out the magnetic attraction between the facing linear motors. A linear roller guide is disposed vertically in a direction perpendicular to the magnetic attraction between the linear motors so that the magnetic attraction from the linear motors does not act on the linear roller guide. In another embodiment, three sets of molding head driving devices are disposed between left and right frames integrally formed projecting from a base to form a molding device. In a further embodiment a pair of double linear motors drives four molding head driving devices. The pair of double linear motors are affixed together by, for example, bolts.

According to an embodiment of the invention, there is provided a molding device comprising: at least two linear motors, the at least two linear motors facing each other separated by a molding head, a magnetic attraction between facing linear motors is canceled out by their positioning facing each other, the linear motors including a magnetic plate disposed toward one of the molding head and the frame, and a movable slide disposed toward the other of the molding head and the frame, a guiding device for guiding raising and lowering of the molding head along a vertical direction perpendicular to a direction of magnetic attraction between the linear motors, and the magnetic attraction from the linear motor is prevented from acting upon the guiding device.

According to a feature of the invention, there is provided a molding device comprising: a molding head, a guiding device for guiding the molding head in a linear direction, a molding head driving device, the molding head driving device including at least first and second linear motors, with one of the first and second linear motors fixed on each side of the molding head, each of the first and second linear motors including a movable slider and a magnetic plate, one of the movable slider and the magnetic plate being affixed to the molding head, and the other of the movable slider and magnetic plate being affixed to the molding head, a magnetic field of the magnetic plates in the first and second linear motors being oriented so that magnetic fields therefrom cancel at the guiding device, the guiding device being disposed vertically in a direction perpendicular to the magnetic attraction between the linear motors, the molding head driving device is formed in a modular structure so that the guiding device is not affected by the magnetic attraction between the linear motors, and at least one of the molding head driving devices is disposed between a left frame, a center frame, and a right frame projecting from a common base.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
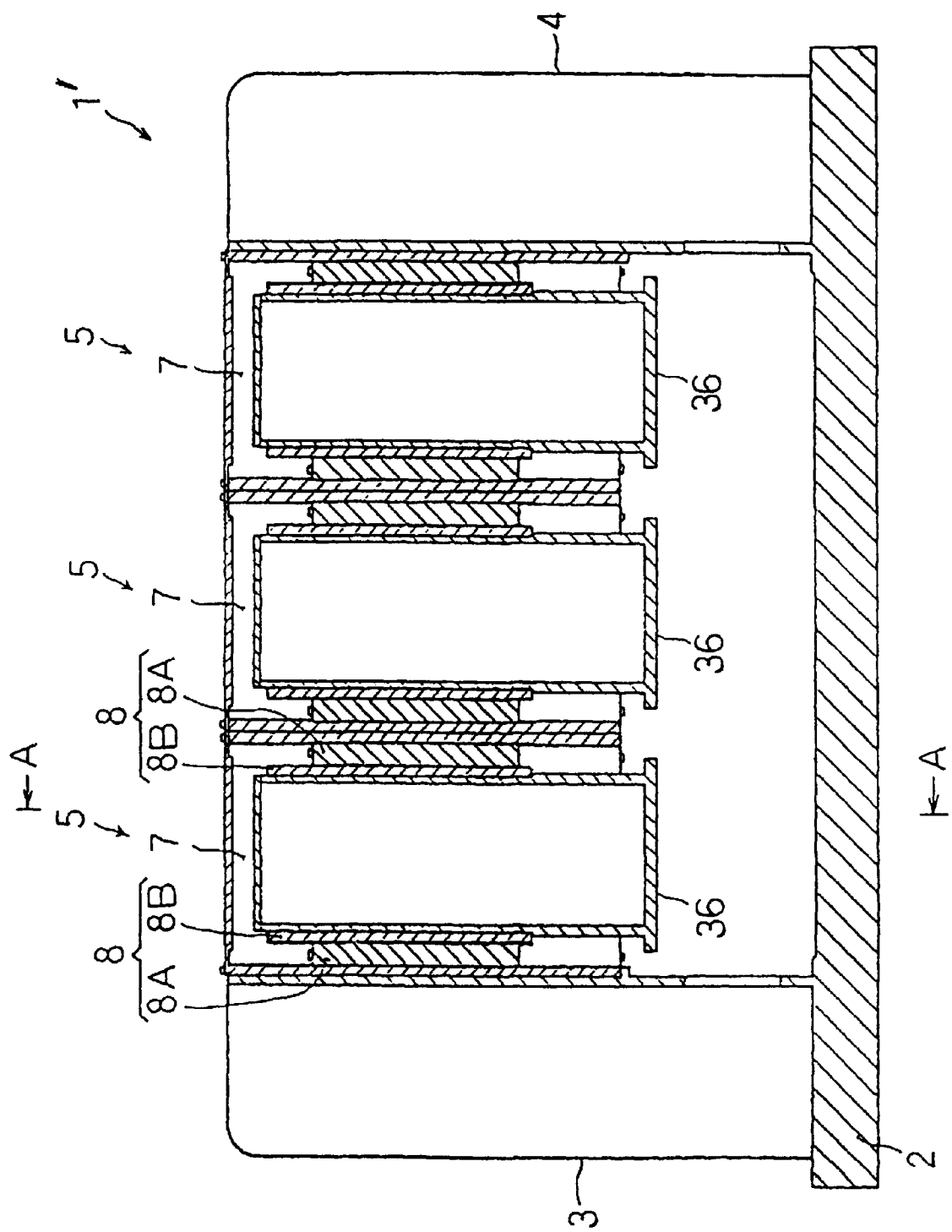
FIG. 1 is a cross section of a molding device having a plurality of mold driving devices on a common base.
Figure 1A:
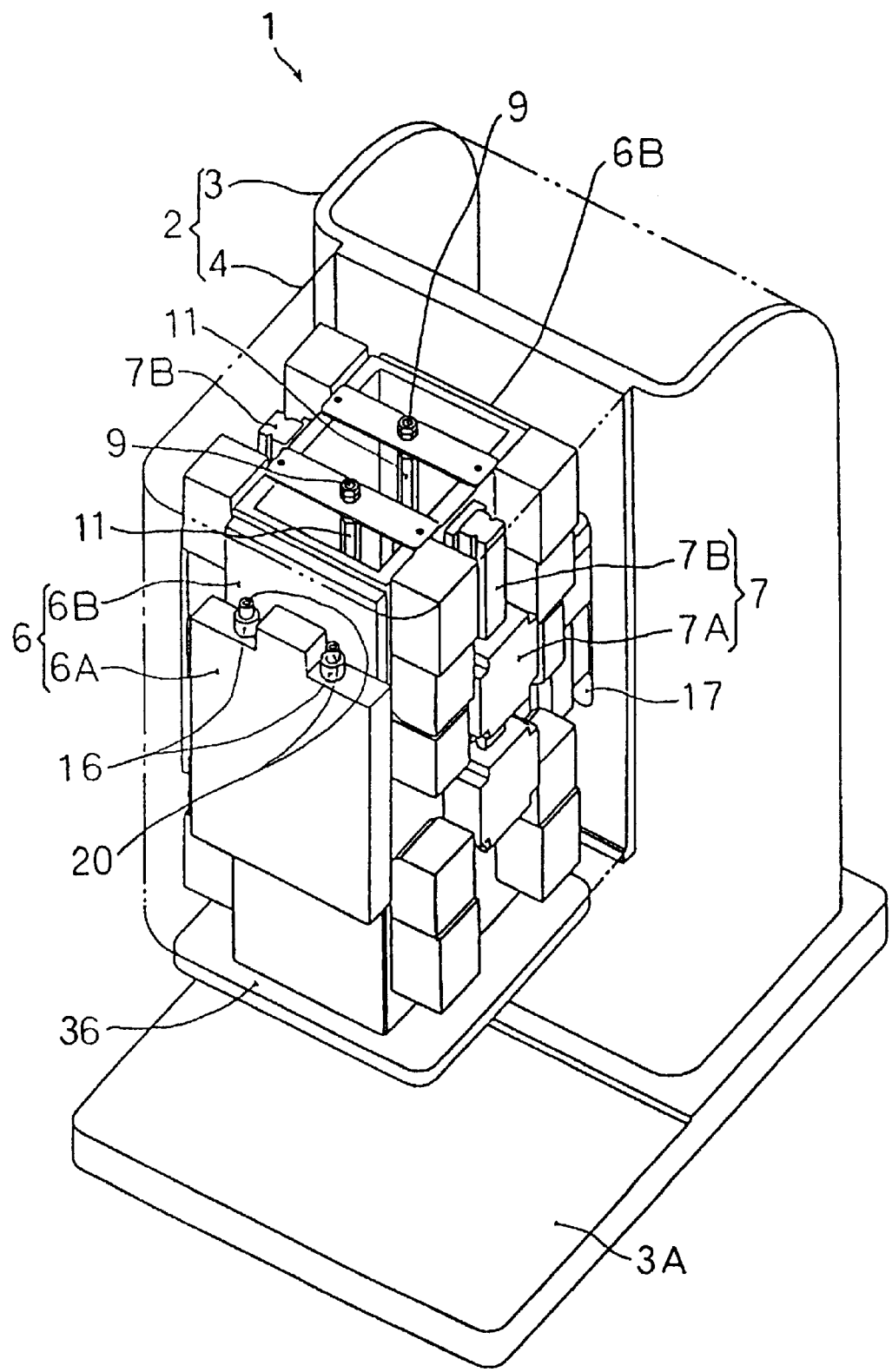
FIG. 1A is a schematic front-view perspective drawing of a molding device according to an embodiment of the present invention.
Figure 2:
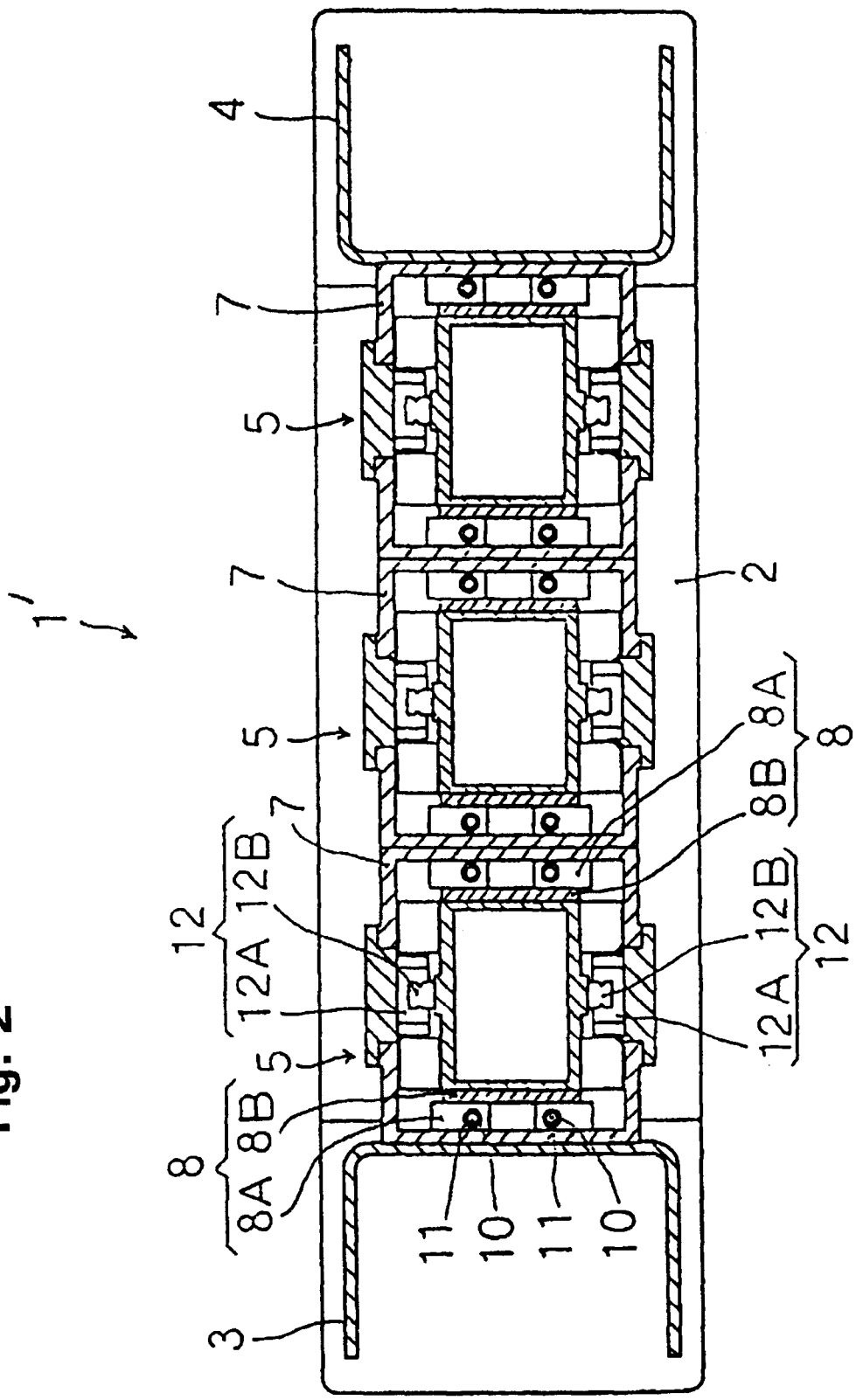
FIG. 2 is a cross section taken along A—A in FIG. 1.
Figure 2A:
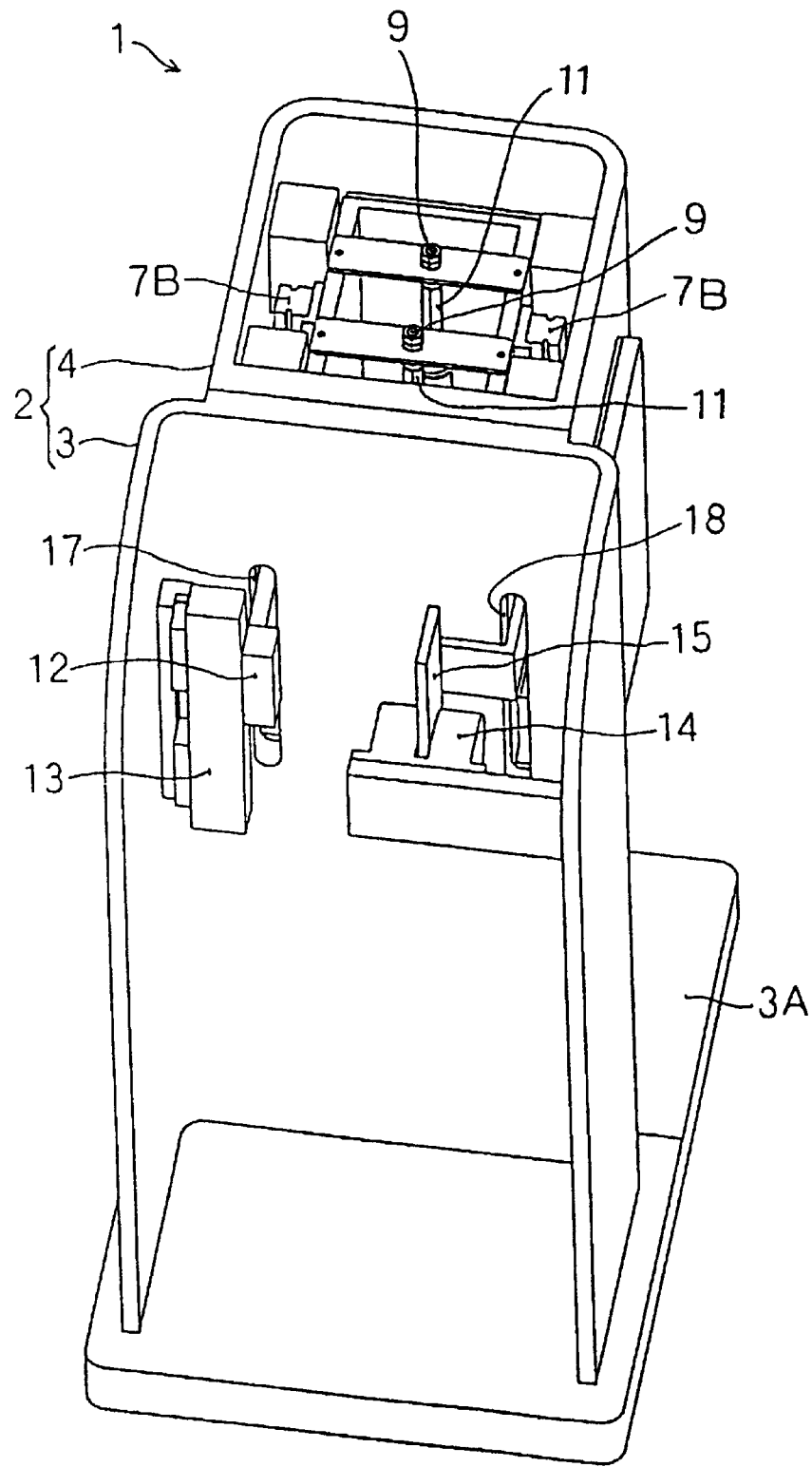
FIG. 2A is a schematic rear-view perspective drawing of the molding device of FIG. 1A.
Figure 3:
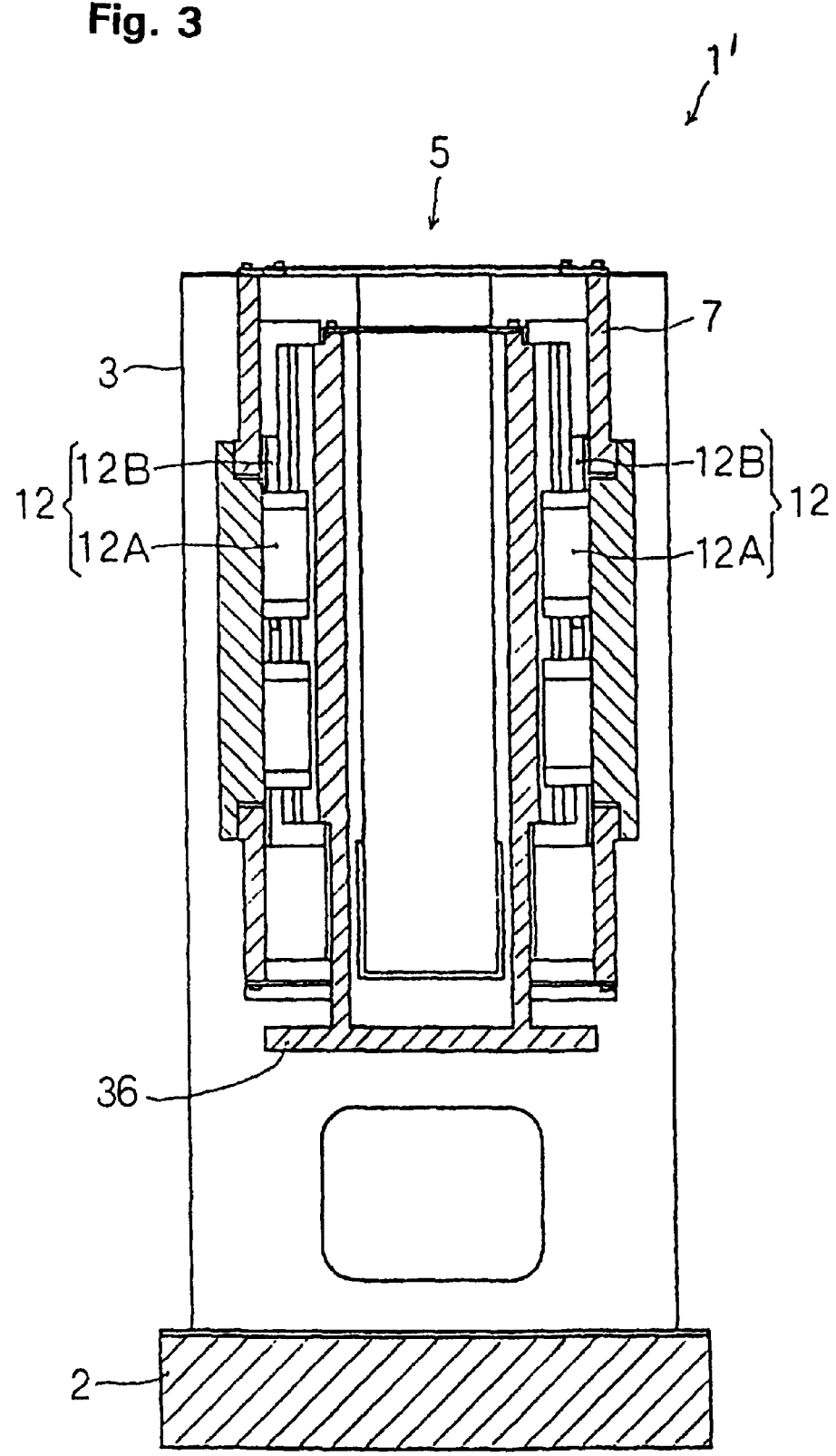
FIG. 3 is a vertical cross section through one of the mold driving devices of FIG. 1.
Figure 3A:
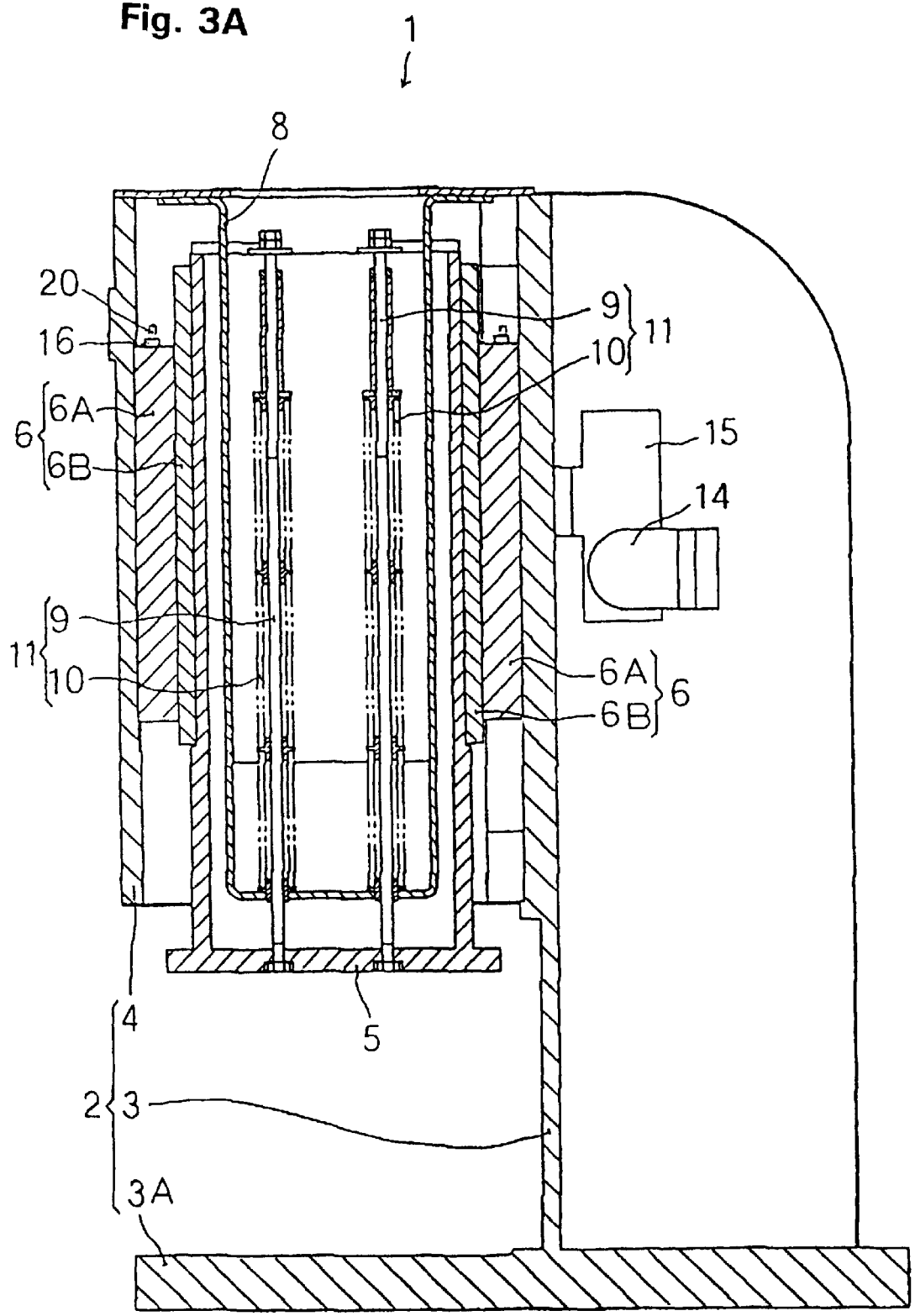
FIG. 3A is a schematic cross-section drawing of the molding device of FIG. 1A.

Referring to FIGS. 1A, 2A and 3A, a frame 2 of a molding device I includes a left frame 3 having a table 3A on which a lower mold (not shown in the figures) may be attached. A right frame 4 is fixed to the left frame 3. The front frame includes a vertical driving section for a molding head 36, which is raised and lowered. An upper mold (not shown in the figures) may be attached to the molding head 36.

Figure 4:
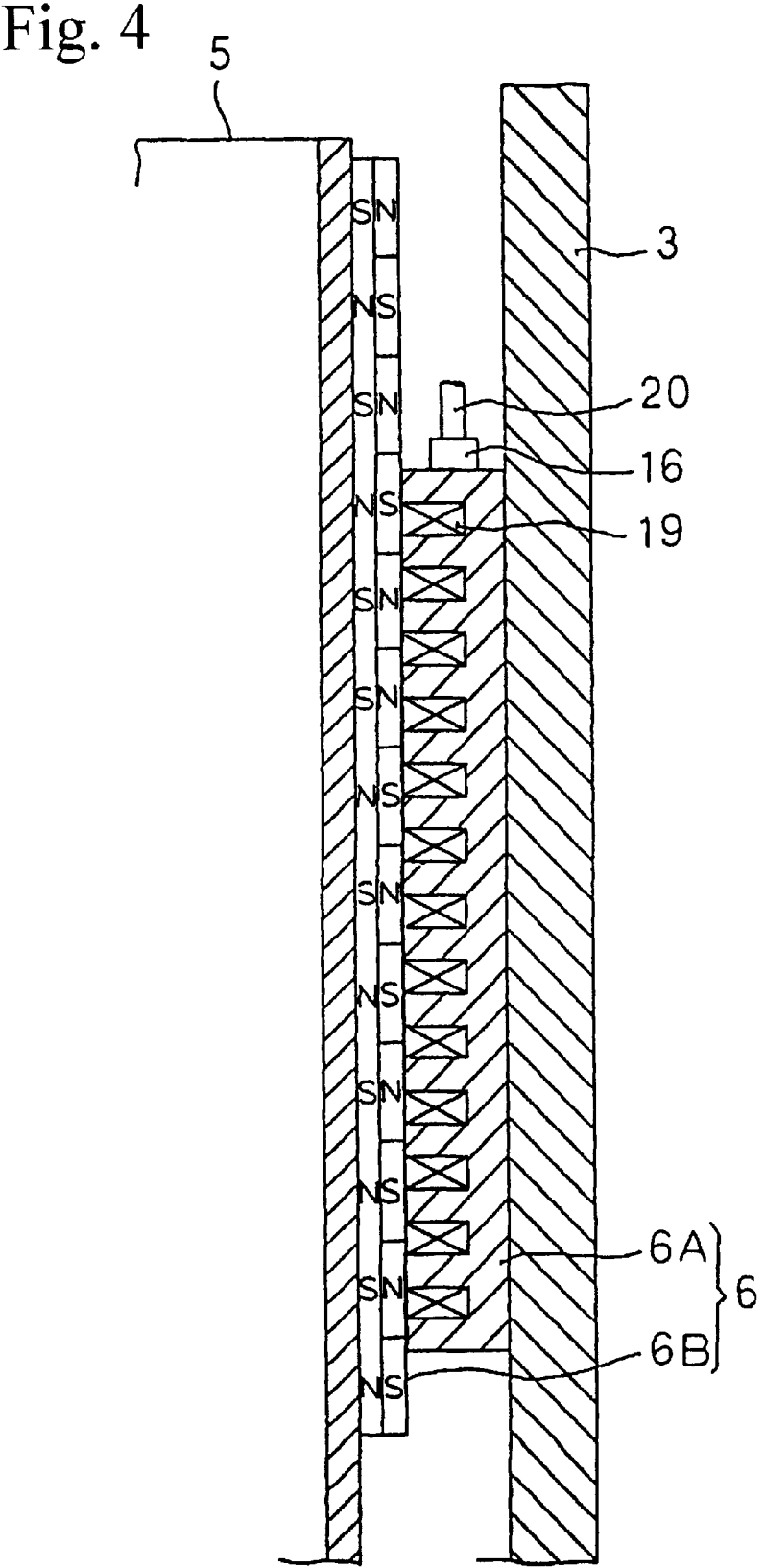
FIG. 4 is a drawing to which reference will be made in describing the structure of the linear motor.

Referring now also to FIG. 4, movable sliders 6A, 6A of a linear motor 6 are fixed to the inner front surface and the rear front surface of the front frame 4. Magnetic plates 6B, 6B are fixed to the front surface and the rear surface of the molding head 36, which is disposed inside of the right frame 4. Magnetic plates 6B, 6B face and engage movable sliders 6A, 6A, which are disposed on the right frame 4.

The linear motor 6 includes: a movable slider 6A, in which a coiled wire 19 and a cooling section therefor are formed integrally. A magnetic plate 6B, formed from N poles and S poles of a permanent magnet is separated by a space from the movable slider 6A. Continuous thrusting is obtained by controlling and synchronizing the current phase through coil 19 of the movable slider 6A based on the positions of the magnetic polarities facing the coil 19.

A forced cooling pipe not shown in the figures is embedded inside the movable slider 6A very close to the coiled wire 19. The cooling pipe absorbs the heat generated in the coiled wire 19. A cooling device not shown in the figures provides cooling by supplying a cooling fluid via pipes 20, 20, which are connected to openings 16, 16 disposed at the end of the movable slider 6A, thus allowing efficient external discharging of heat. This minimizes the effect of heat generated by the linear motor 6 on the molding device.

The cooling of the linear motor 6 can also be accomplished using an air-cooling method.

Roller units 7A, 7A are fixed to the inner left surface and the inner right surface of the right frame 4. Guide rails 7B, 7B, facing and engaging the roller units 7A, 7A disposed on the right frame 4, are fixed to the left surface and right surface of the molding head 36.

A counter-balancing device 11 is disposed inside the molding head 36. The counter-balancing device 11 urges the mass of the molding head 36, including an upper mold not shown in the figure, toward a predetermined position using the force from a spring 10 via a bracket 8 fixed to the right frame 4 and a stud bolt 9 engaging the bracket 8.

A linear scale 13, disposed at a rear section of the left frame 3, is scanned by a detection head 12 to detect the vertical position of the molding head 36. The detection head 12 is positioned where it avoids obstructing the linear motor 6. The detection head 12 projects from the molding head 36 through a cut-out opening 17 in the left frame 3.

A spring-activated, electromagnetically open support device 14 is disposed at a rear section of the left frame 3. A disk plate 15 projects from the molding head 36 through a cut-out opening 18 in the main frame 3 so as to avoid obstructing the linear motor 6. When power to the molding device 1 is cut off due to the completion of work or a power outage, the disk plate 15 is secured via a spring not shown in the figures, thus reliably keeping the molding head 36 at its stopping position.

When power is sent to the molding device 1, the support device 14 is excited and the spring (not shown in the figure) is activated to open the disk plate 15.

When the disk plate 15 is opened, current is applied to the coils 19, 19 of the movable sliders 6A, 6A of the linear motors 6, 6 based on a stroke length and top dead center and bottom dead center for the molding head 36 as defined beforehand in a control device not shown in the drawings. The molding head 36 is raised and lowered by the thrust of the linear motors 6, 6. Linear roller guides 7, 7, which serve as a guiding device, are disposed vertically in a direction perpendicular to the direction of magnetic attraction between the linear motors 6, 6. Thus, the magnetic attraction from the linear motors 6 is not applied to the linear roller guide 7, thereby providing stable and accurate positioning for the bottom dead center.

In the linear motors 6 of this embodiment, the movable slider 6A is fixed toward the right frame 4 and the magnetic plate 6B is fixed toward the molding head 36. However, it would is also possible to form the linear motors 6 with the magnetic plate 6B fixed to the right frame 4 and the movable slider 6A fixed to the molding head 36.

Also, in the linear roller guide 7 of this embodiment, the roller unit 7A is fixed toward the right frame 4 and the guide rail 7B is fixed to the molding head 36. However, it is also possible to form the linear roller guide 7 with the guide rail 7B fixed toward the front frame 4 and the roller unit 7A fixed toward the molding head 36.

Furthermore, the counter-balancing device 11 in this embodiment is performed by a spring device. It is also possible to use an air-cylinder, or other device for counter-balancing. The supporting device 14, which is described above as a spring-activated electromagnetically open device, can also be a spring-activated activated air-pressure opening device or a spring-activated oil-pressure device.

As the description above makes clear, the present invention provides high positioning accuracy for the bottom dead center of the molding head that is not affected by thermal displacement or the like. Furthermore, the present invention can be used with limited installation space and clean work environments, and provides a molding device having a molding head with limited noise and vibration that can be reliably positioned during high-speed operations.

Also, the stopping position of the molding device can be reliably maintained after an operation is completed or when the power to the molding device is cut off due to a power outage or the like.

Referring to FIGS. 1, 2 and 3, a multiple molding device 1' includes a left frame 3 and a right frame 4 formed integrally with a base 2. A lower die 9 (not shown in the figures) is attached the base 2. A plurality of molding heads 36 are disposed inside three identical molding head drive devices 5, 5, 5. The molding head drive devices are disposed between the left frame 3 and the right frame 4. The molding head drive devices 5, 5, 5 are raised and lowered as a single unit. A plurality of upper dies (not shown in the figures) are attached to the molding heads 36.

Movable sliders 8A, 8A are fixed to the inner left surfaces and the inner right surfaces of casings 7. Magnetic plates 8B, 8B, which engage the movable sliders 8A, 8A of the casings 7, are fixed to the left side surfaces and the right side surfaces of the molding heads 6 inside the casings 7 so that they face the movable sliders 8A, 8A.

Referring now to FIG. 4, each linear motor 8 in this embodiment is the same as the single-die linear motor described above, and thus further description thereof is omitted.

Returning now to FIG. 1 through FIG. 3, roller units 12A, 12A are fixed to the inner front surface and the inner rear surface of the casing 7. Guide rails 12B, 12B, facing the roller units 12A, 12A engage roller units 12A, 12A of the casing 7. Guide rails 12B, 12B are fixed to the front surface and the rear surface of the molding head 36, thus forming linear roller guides 12, 12.

As described above, the members which form the molding head drive devices 5 are disposed inside the casings 7 to form a single unit. The molding heads 36 of the molding head drive devices 5, 5, 5 can be raised and lowered according to a desired stroke length and timing. Thus, a wide variety of products requiring multi-step processing can be easily obtained.

Current is passed through the coils 9, 9 (FIG. 4) in the movable sliders 12A, 12A of the linear motor 8, 8 according to the top dead center and the bottom dead center of the molding head 36 and the stroke length as entered beforehand in a control device not shown in the figures. The molding head 36 is raised and lowered by the thrust of linear motors 8, 8 to perform pressing of a given material between a lower die (not shown in the figures) attached to the base 2 and an upper die (not shown in the figures) attached to the molding head 36.

By having facing linear motors 8, 8 disposed on either side of the molding head 36, the magnetic attraction between the facing linear motors 8, 8 is canceled out, thus allowing smooth raising and lowering of the molding head 36.

Also, the linear roller guides 12, 12, which serve as a guiding device, are disposed vertically in a direction perpendicular to the attachment position of the linear motors 8, 8, i.e. to the direction of magnetic attraction between the linear motors 8, 8. Thus, the magnetic attraction from the linear motor 8 is not applied to the linear roller guide 12, and stable positioning accuracy for the bottom dead center is provided.

In this embodiment, linear motor 8 is formed by having the movable slider 12A disposed on the casing 7 and the magnetic plate 8b fixed on the molding head 36. However, it would also be possible to have the linear motor 8 formed with the magnetic plate 8b fixed on the casing 7 and with the movable slider 12A fixed on the molding head 36.

Also, in this embodiment, the linear roller guide 12 is formed by having the roller unit 12A fixed to the casing 7 and the guide rail 12B fixed to the molding head 36. However, it would also be possible to have the linear roller guide 12 formed with the guide rail 12B fixed to the casing 7 and the roller unit 12A fixed to the molding head 36.

Figure 5:
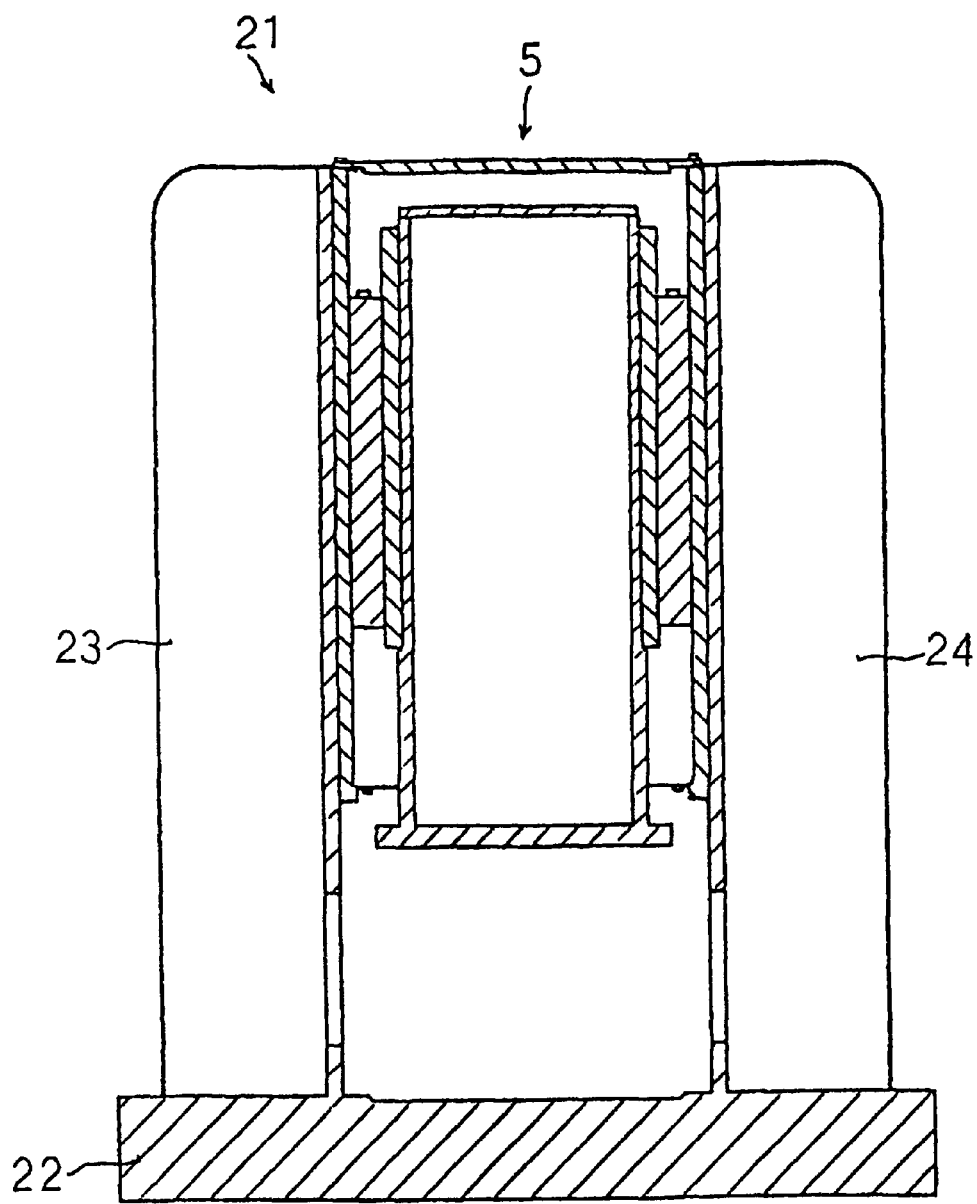
FIG. 5 is a vertical cross section through a further embodiment of a mold driving device.

Referring to FIG. 5, a second embodiment of the invention includes a molding device 21 having a left frame 23 and a right frame 24 formed integrally with a base 22. A single molding head driving device 5 is interposed between a left frame 23 and a right frame 24. The second embodiment is identical to the first embodiment shown in FIG. 1 through FIG. 4 except for the number of molding head driving devices 5, so the description will be omitted.

Figure 6:
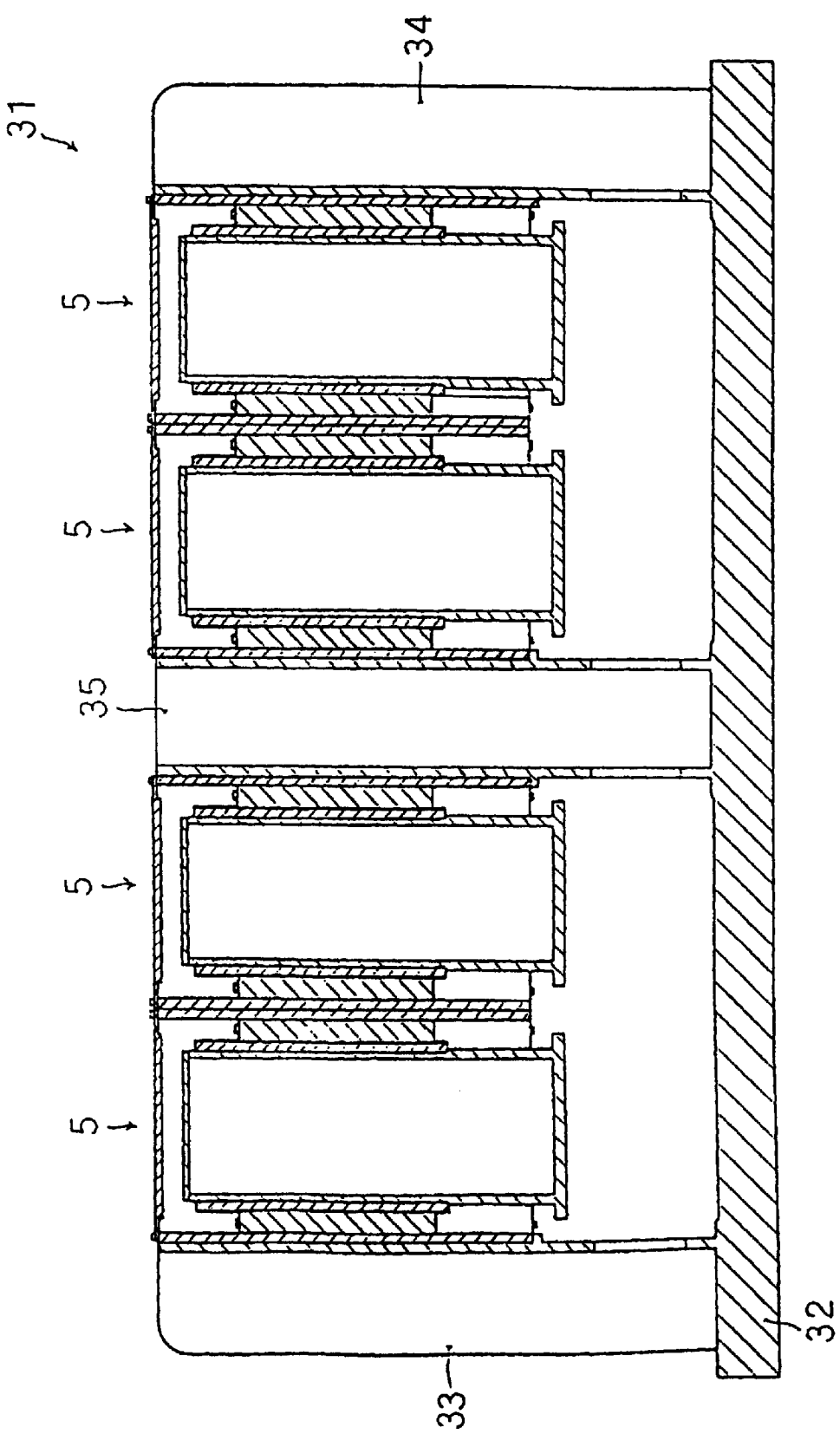
FIG. 6 is a vertical cross section showing two pairs of mold driving devices on a common base.

Referring to FIG. 6, there is shown a third embodiment of the present invention which includes two pairs of molding head driving devices 5. The operation of this embodiment is the same as in the previous embodiments, and will therefore be omitted.

Figure 7:
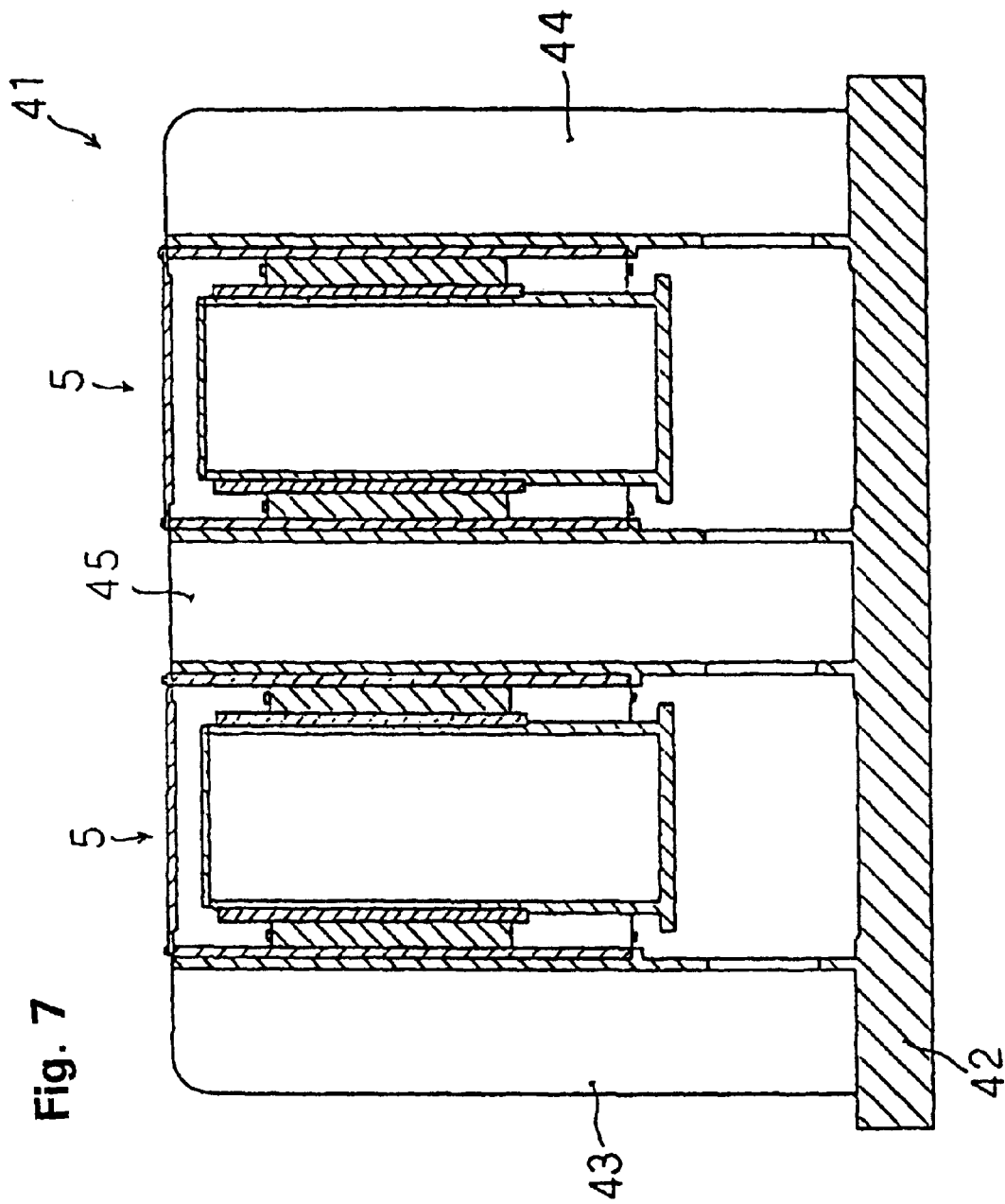
FIG. 7 is a vertical cross section showing one pair of mold driving devices on a common base, disposed between separate pairs rails integrally formed with the base.
Figure 8:
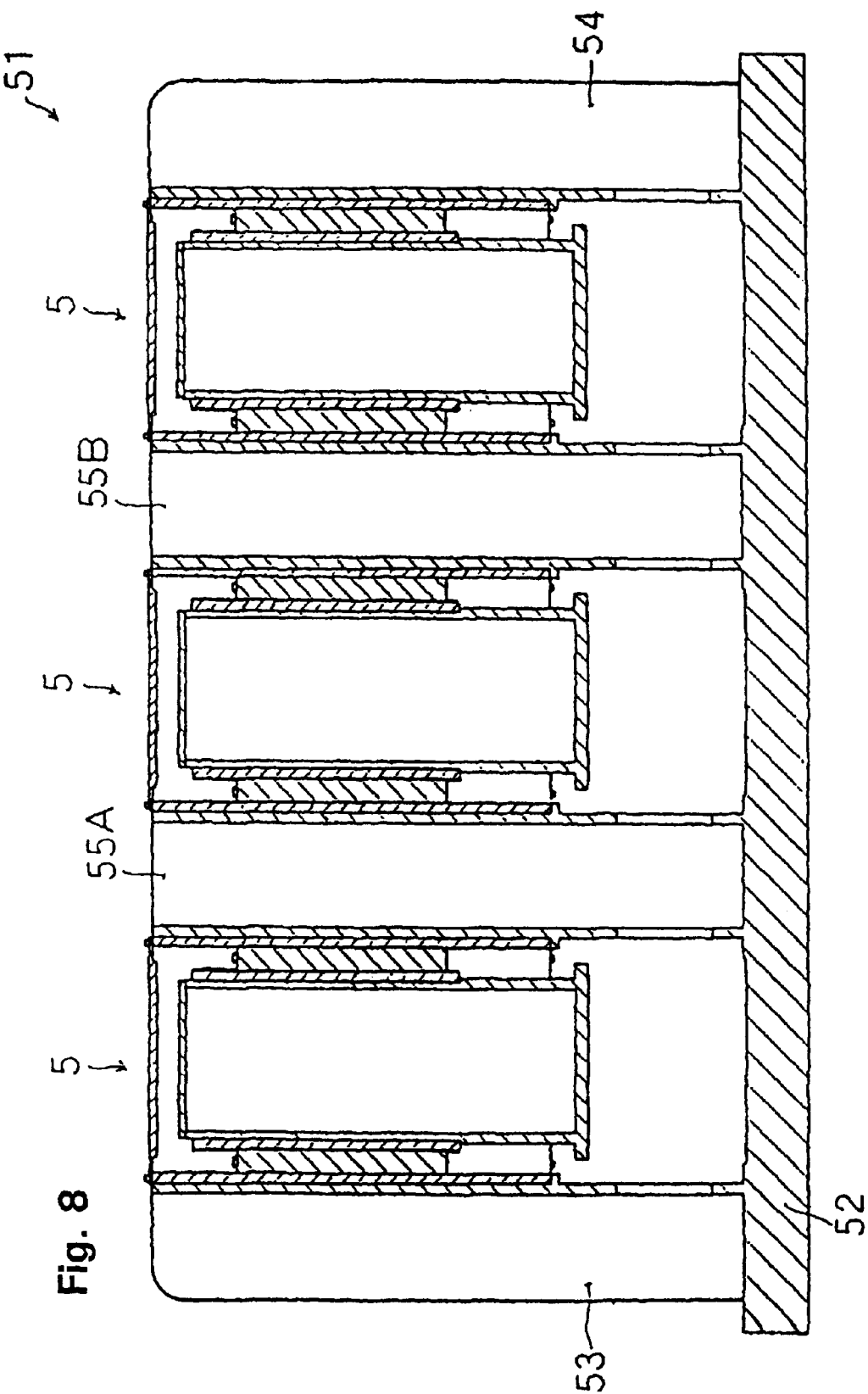
FIG. 8 is a vertical cross section similar to FIG. 7, except for showing three mold driving devices on the common base, disposed between separate pairs of rails integrally formed with the base.

Referring to FIG. 7, there is shown a fourth embodiment which includes a single pair of molding head driving devices 5. Referring to FIG. 8, there is shown a fifth embodiment. The operation of this embodiment is the same as in the previous embodiments, and will therefore be omitted.

The third embodiment, the fourth embodiment, and the fifth embodiment are identical to the first embodiment described above except for the middle frame, so a detailed description will be omitted.

Returning to FIG. 6, a molding device 31 according to the third embodiment includes a left frame 33 and a right frame 34 integrally with a base 32. A middle frame 35 is formed integrally with the base 32 at a central position between the left frame 33 and the right frame 34. Two identical molding head driving devices 5, 5 are interposed as a single unit between the left frame 33 and the left side surface of the middle frame 35. Two identical molding head driving devices 5, 5 are interposed as a single unit between the right side surface of the middle frame 35 and the right frame 34.

Returning to FIG. 7, a molding device 41 according to the fourth embodiment includes a left frame 43 and a right frame 44 integrally formed with a base 42. A center frame 45 is formed integrally with the base 42 at a central position between the left frame 43 and the right frame 44. A single molding head driving device 5 is interposed between the left frame 43 and the left side surface of the middle frame 45. A single molding head driving device 5 is interposed between the right side surface of the middle frame 45 and the right frame 44.

Referring to FIG. 8, a fifth embodiment of the invention includes a left frame 53 and a right frame 54 integrally formed with a base 52. A first middle frame 55A and a second middle frame 55B are formed integrally with the base 52 between the left frame 53 and the right frame 54.

A single modular molding head driving device 5 is interposed between the left frame 53 and the left side surface of the first middle frame 55A. A single modular molding head driving device 5 is interposed between the right side surface of the first middle frame 55A and the left side surface of the second middle frame 55B.

Furthermore, a single modular molding head driving device 5 is interposed between the right side surface of the second middle frame 55B and the right frame 54, thus forming the molding device 51.

In the embodiments described above, the molding head driving devices 5 interposed between the left frames 3, 23, 33, 43, 53 and the right frames 4, 24, 34, 44, 54 all have identical structures. However, it is also possible to use a different type of molding head driving device 5 for the ones attached to the left frames 3, 23, 33, 43, 53 and the right frames 4, 24, 34, 44, 54, with casings 7 having different attachment sections.

Figure 9:
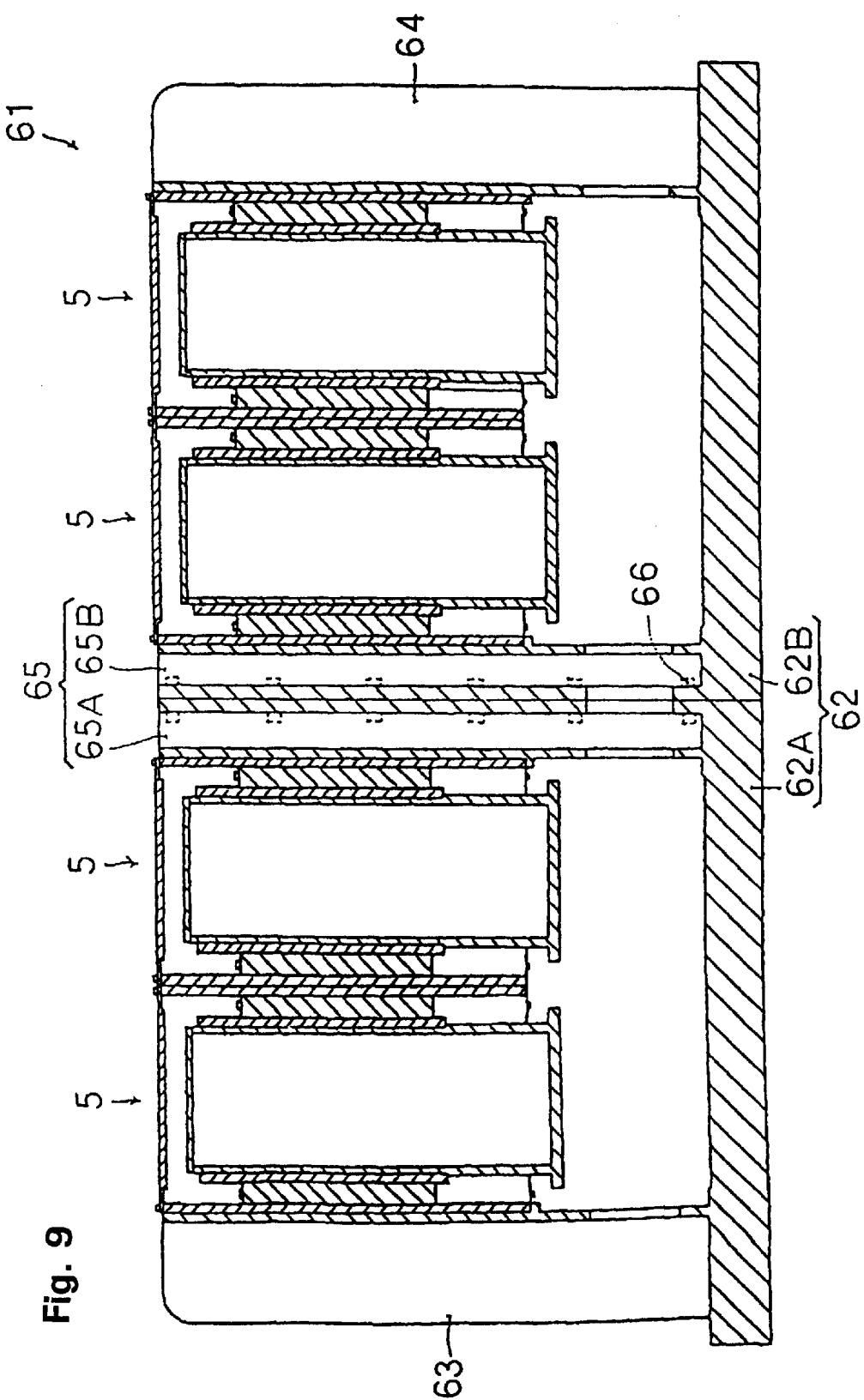
FIG. 9 is a vertical cross section showing two pairs of slide driving devices, wherein each pair of slide driving devices is on its own base, and the two bases are connected together.

Also, in these embodiments, the middle frames 35, 45, 55 are formed in two pieces. Referring to FIG. 9, it would also be possible, as shown in a sixth embodiment, to have a molding device 61 formed, for example, by connecting a left center frame 65A projected from a base 62A and a right center frame 65B projected from a base 62B using tightening means 66, e.g., a bolt.

Also, in these embodiments, the molding head driving devices 5 interposed between the left frames 3, 23, 33, 43, 53 and the right frames 4, 24, 34, 44, 54 use the side on which the linear motor 8 is attached as the connecting surface. However, it would also be possible to use the side on which the linear roller guide 12 is attached as the connecting surface.

As described above, the present invention provides a molding device that allows positioning of molding heads for high-speed operations. Noise and vibration is limited, and the bottom dead center of the molding head can be precisely positioned without being affected by thermal displacement or the like. The present invention can also be used in clean work environments and in limited installation spaces.

Furthermore, when processing small, precision parts that require multiple steps, the frame can be structured according to the molding steps, thus making the present invention easy to implement for a molding line.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A molding device comprising:
   at least two linear motors mounted on a frame;
   said at least two linear motors facing each other separated by a molding head;
   a magnetic attraction between said facing linear motors is canceled out by their facing each other;
   said linear motors including a magnetic plate disposed toward one of said molding head and said frame, and a movable slide disposed toward the other of said molding head and said frame;
   said linear motors permitting vertical movement of said molding head;
   a guiding device for guiding a raising and a lowering of said molding head along a vertical direction perpendicular to a direction of magnetic attraction between said linear motors; and
   said magnetic attraction from said linear motors is prevented from acting upon said guiding device.

2. A molding device as recited in claim 1 wherein:
   said guiding device is a linear roller guide;
   said linear roller guide including at least two linear roller guides fixed on opposite sides of said molding head; and
   said linear roller guides including a guide rail toward one of said molding head and said frame, and a roller unit toward the other of said molding head and said frame.

3. A molding device as recited in claim 1, further comprising a linear scale disposed to detect a position of said molding head.

4. A molding device as recited in claim 2, further comprising a linear scale disposed to detect a position of said molding head.

5. A molding device as recited in claim 1, further comprising a counter-balancing device for balancing a mass of said molding head.

6. A molding device as recited in claim 2, further comprising a counterbalancing device for balancing a mass of said molding head.

7. A molding device as recited in claim 6 wherein said counter-balancing device is one of a spring device and an air-cylinder device.

8. A molding device as recited in claim 1 further comprising:
   a support device;
   said support device including means for supporting said molding head at a stopping position when power to said molding device is shut off.

9. A molding device as recited in claim 8 wherein:
   said support device is one of a spring-activated electromagnetically open device, a spring-activated air-pressure opening device, and a spring-activated oil-pressure device.

10. A molding device according to claim 1, wherein said molding device is formed in a modular structure.

11. A molding device according to claim 1 wherein at least one molding head driving device is disposed between first and second frames projecting integrally upward from a base.

12. A molding device according to claim 11, further comprising:
  a second molding head driving device on a common base with said molding head driving device;
  said second molding head driving device being disposed between said second frame and a third frame projecting upward from said base; and
  said second molding head driving device and said molding head driving device forming a dual molding head driving device.

13. A molding head driving device according to claim 12, further comprising a second dual molding head driving device integrated with said dual molded driving device, whereby four molding heads are drive able thereby.

14. A molding head driving device according to claim 12, wherein:
  said second molding head driving device is formed on a second base, said molding head driving device is formed on a first base; and
  said first and second bases are integrally formed.

15. A molding head driving device according to claim 12, wherein:
  said second molding head driving device is formed on a second base, said molding head driving device is formed on a first base; and
  said first and second bases are joined with at least one fastening device.

16. A molding device comprising:
  a molding head;
  a guiding device for guiding said molding head in a linear direction;
  a molding head driving device;
  said molding head driving device including at least first and second linear motors, with one of said first and second linear motors fixed on each side of said molding head;
  each of said first and second linear motors including a movable slider and a magnetic plate;
  one of said movable slider and said magnetic plate of said first linear motor being affixed to said molding head, and one of said movable slider and magnetic plate of said second linear motor being affixed to said molding head;
  a magnetic field of said magnetic plates in said first and second linear motors being oriented so that magnetic fields therefrom cancel at said guiding device;
  said guiding device being disposed vertically in a direction perpendicular to said magnetic attraction between said linear motors;
  said molding head driving device is formed in a modular structure so that said guiding device is not affected by said magnetic attraction between said linear motors; and
  at least one of said molding head driving devices is disposed between a left frame, a center frame, and a right frame projecting from a common base.

17. A molding device as recited in claim 16 wherein:
  said guiding device includes first and second linear roller guides each including a guide rail and a roller unit;
  said first and second linear roller guides are fixed at opposed sides of said molding head, with said linear roller guides being formed;
  each of said linear roller guides including one of a roller unit and a guide rail on said casing, and the other of said roller unit and said guide rail on said molding head.

18. A molding device as recited in claim 16 wherein:
  said guiding device includes first and second linear roller guides each including a guide rail and a roller unit;
  said first and second linear roller guides are fixed at opposed sides of said molding head, with said linear roller guides being formed;
  each of said linear roller guides including one of a roller unit and a guide rail on said casing, and the other of said roller unit and said guide rail on said molding head.

* * * * *